Patented Aug. 22, 1944

2,356,171

UNITED STATES PATENT OFFICE 2,356,171

COMPOSITION OF MATTER

Roger A. Mathes, Akron, Ohio, assignor to The B. F. Goodrich Company, New York, N. Y., a corporation of New York No Drawing. Application October 21, 1941, Serial No. 415,946

7 Claims. (Cl. 260—132)

This invention relates to a new composition of matter and pertains specifically to the product obtained by reacting an aminoalkyl sulfide with sulfur.

The term "aminoalkyl sulfide" includes not only the aminoalkyl hydrosulfides (or mercaptans) but also the diaminodialkyl monosulfides and polysulfides containing no more than four sulfur atoms. The amino group may have its hydrogen atoms replaced by hydrocarbon groups, such as methyl, ethyl, phenyl, etc. The alkyl chain between the sulfur and nitrogen atoms may contain no more than three carbon atoms, although it may have a hydrocarbon side-chain such as methyl, ethyl, butyl, phenyl, etc.

Typical of the compounds which may be reacted with sulfur to produce my new compounds are 1,1'-diaminodimethyl mono-, di-, or tetrasulfide; 2,2'-diaminodiethyl mono-, di-, or tetrasulfide; 2,2'-diaminodi-n-propyl mono-, di-, or tetrasulfide; 2,2'-diethyl-3,3'-diaminodi-n-propyl mono-, di-, or tetrasulfide; 2,2'-diphenyl-3,3'-diaminodi-n-propyl mono-, di-, tetrasulfide; 3,3'-diaminodi-n-propyl mono-, di-, or tetrasulfide; N,N' - dimethyl-2,2' - diaminodiethyl mono-, di-, or tetrasulfide; N,N'-dimethyl-N,N'-diethyl-2,2'-diaminodi-n-propyl mono-, di-, or tetrasulfide; N,N' - diphenyl - 3,3' - diaminodi - n-propyl mono-, di-, or tetrasulfide; aminomethyl mercaptan; 2-aminoethyl mercaptan; 2-amino-n-propyl mercaptan; N-phenyl-2-aminoethyl mercaptan; N,N'-dimethyl-2-amino-n-propyl mercaptan; N-ethyl-3-amino-n-propyl mercaptan; N - methyl - N - ethyl - 2 - aminoethyl mercaptan; 2-phenyl-3-amino - n - propyl mercaptan; and other similar compounds.

Although the mechanism of the reaction is not fully understood, it is believed that the sulfur reacts with the primary or secondary amino groups inasmuch as amounts of sulfur ranging up to one mole may be reacted with one mole of one of the aforementioned compounds containing one amino group.

As specific examples of my invention I describe the preparation of two of these compounds.

Example I

There are stirred together 21 parts by weight of 2,2'-diaminodiethyl monosulfide and 11.2 parts of sulfur. The heat of reaction causes the temperature of the mixture to rise appreciably; further heat may be applied externally to ensure completion of the reaction, if desired. In general, heating to 70° to 80° C. for a few minutes is sufficient for completion of the reaction. The product is a reddish brown viscous syrup.

Example II

There are mixed together 7.6 parts by weight of 2,2'-diaminodiethyldisulfide and 3.2 parts of sulfur. After heating to 70° to 80° C. for a few minutes, the product is a heavy, dark brown syrup.

The products of my invention are useful as insecticides and fungicides or as accelerators for the vulcanization of rubber. As an indication of their vulcanization accelerating properties I give as an example the vulcanization of the following rubber composition, in which the parts are by weight:

| | |
|---|---|
| Rubber | 100 |
| Zinc oxide | 5 |
| Sulfur | 3 |
| Lauric acid | 1 |
| Reaction product of Example I | 1 |

After vulcanization for fifteen minutes at 287° F. this stock has an ultimate tensile strength of more than 3000 lbs. per sq. in. Similar results may be secured with other similar compounds prepared as described above.

My new compounds may be used to accelerate the vulcanization of any rubber, natural or synthetic, which can be vulcanized with sulfur, such as caoutchouc, balata, gutta percha, latex, artificial rubber isomers, and copolymers of conjugated diene hydrocarbons with other co-polymerizable monomers, e. g., copolymers of butadiene with either styrene, acrylonitrile, methyl acrylate, methyl methacrylate or the like. The presence of any of the usual pigments, dyes, fillers, softeners, antioxidants, other accelerators, etc., has no deleterious effect on the accelerating action of my new compounds. It is desirable to use an organic acid, such as lauric acid or other fatty acid, or a metal salt of such acid, in conjunction with my new accelerators, although the presence of the acid is not essential.

Any of the usual methods of vulcanization, such as heating in a mold, in hot water, steam, hot air, etc., gives a satisfactory product with my new compounds.

The rubber stocks made with my accelerators are not limited in their use, but are applicable to a wide variety of products, such as pneumatic and solid tires, belts, hose, footwear, latex-dipped goods, surgical goods, all kinds of molded products, and the like.

My new compounds, although having other uses, are particularly valuable as accelerators for the vulcanization of rubber; for that reason I have described in detail this application of these compounds.

I claim:

1. A composition of matter comprising the addition product prepared by mixing sulfur at a temperature not higher than about 80° C. with an aminoalkyl sulfide which contains no more than four sulfur atoms, and no more than three carbon atoms in the alkyl chain between the sulfur and nitrogen atoms, and in which the aminoalkyl group contains no substituent groups other than hydrogen and hydrocarbon groups, the proportion of sulfur which is reacted with the said aminoalkyl sulfide being no more than one atom of sulfur for each amino group.

2. A composition of matter comprising the addition product prepared by mixing sulfur at a temperature not higher than about 80° C. with an aminoalkyl mercaptan which contains no more than three carbon atoms in the alkyl chain between the sulfur and nitrogen atoms, and in which the aminoalkyl group contains no substituent groups other than hydrogen and hydrocarbon groups, no more than one molecular proportion of sulfur being reacted with each molecular proportion of said mercaptan.

3. A composition of matter comprising the addition product prepared by mixing sulfur at a temperature not higher than about 80° C. with a di(aminoalkyl) monosulfide which contains no more than three carbon atoms in the alkyl chain between the sulfur and nitrogen atoms, and in which the aminoalkyl group contains no substituent groups other than hydrogen and hydrocarbon groups, no more than two molecular proportions of sulfur being reacted with each molecular proportion of said monosulfide.

4. A composition of matter comprising the addition product prepared by mixing sulfur at a temperature not higher than about 80° C. with a di(aminoalkyl) polysulfide containing no more than four sulfur atoms, and no more than three carbon atoms in the alkyl chain between the sulfur and nitrogen atoms, and in which the aminoalkyl group contains no substituent groups other than hydrogen and hydrocarbon groups, no more than two molecular proportions of sulfur being reacted with each molecular proportion of said polysulfide.

5. A composition of matter comprising the addition product prepared by mixing sulfur at a temperature not higher than about 80° C. with 2-aminoethyl mercaptan, no more than one molecular proportion of sulfur being reacted with each molecular proportion of said mercaptan.

6. A composition of matter comprising the addition product prepared by mixing sulfur at a temperature not higher than about 80° C. with 2,2'-diaminodiethyl monosulfide, no more than two molecular proportions of sulfur being reacted with each molecular proportion of said monosulfide.

7. A composition of matter comprising the addition product prepared by mixing sulfur at a temperature not higher than about 80° C. with 2,2'-diaminodiethyl disulfide, no more than two molecular proportions of sulfur being reacted with each molecular proportion of said disulfide.

ROGER A. MATHES.